June 9, 1959
J. L. BONANNO
2,889,744
STEREOSCOPIC VIEWERS
Filed Oct. 19, 1954
7 Sheets-Sheet 1
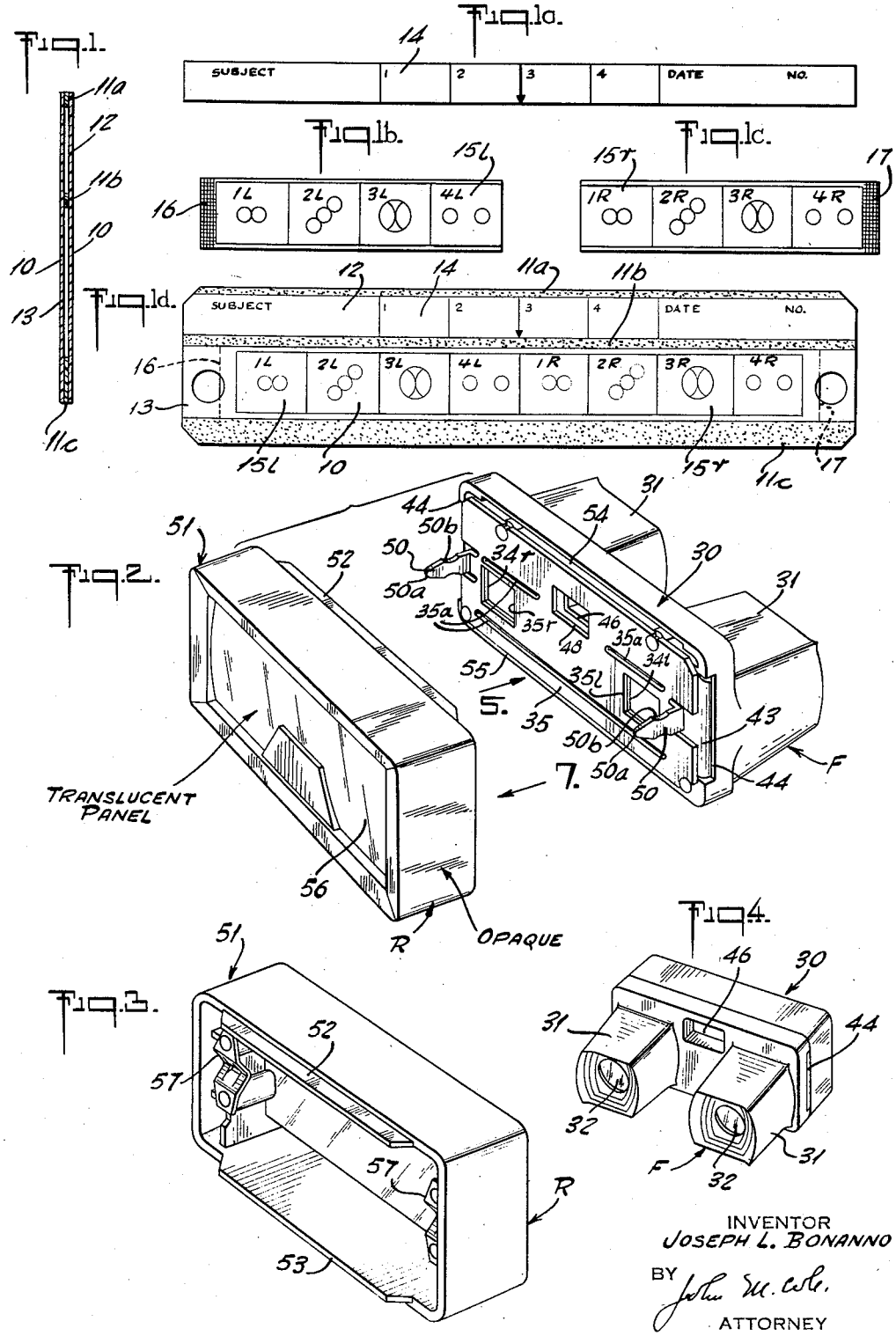
INVENTOR
JOSEPH L. BONANNO
BY
ATTORNEY June 9, 1959    J. L. BONANNO    2,889,744
STEREOSCOPIC VIEWERS
Filed Oct. 19, 1954    7 Sheets-Sheet 2
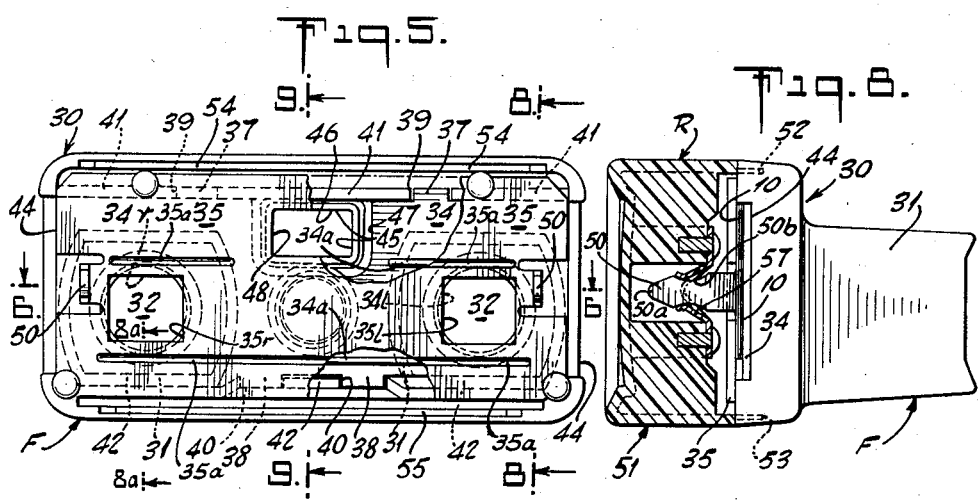
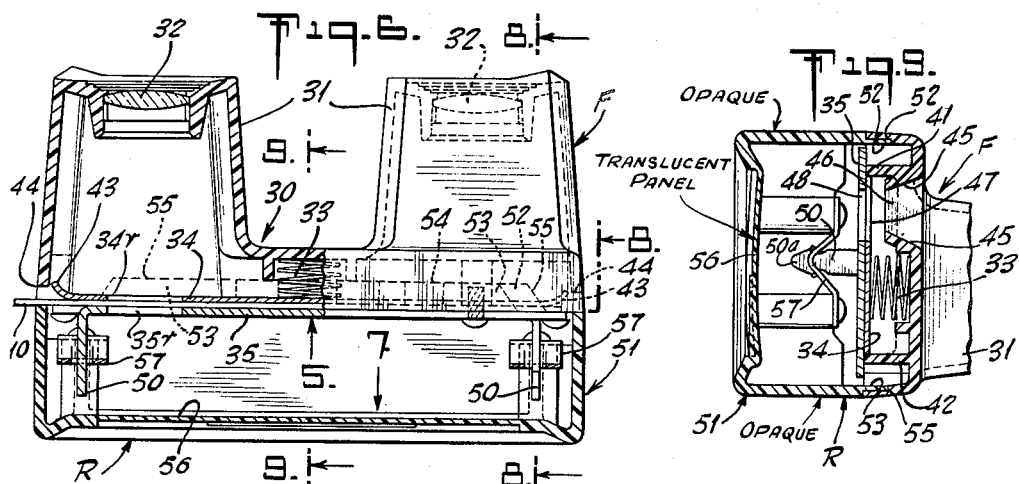
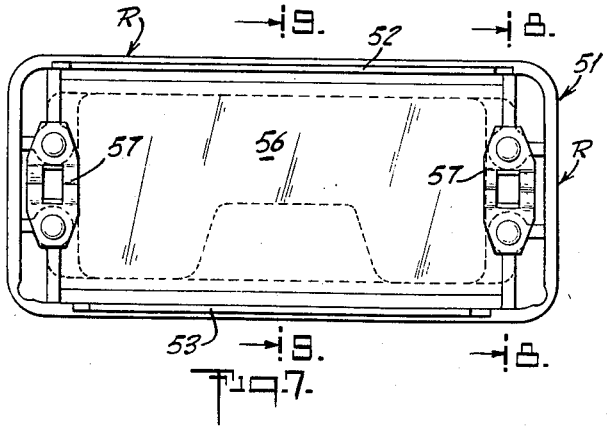
INVENTOR
JOSEPH L. BONANNO
BY
ATTORNEY June 9, 1959      J. L. BONANNO      2,889,744
STEREOSCOPIC VIEWERS
Filed Oct. 19, 1954      7 Sheets-Sheet 3
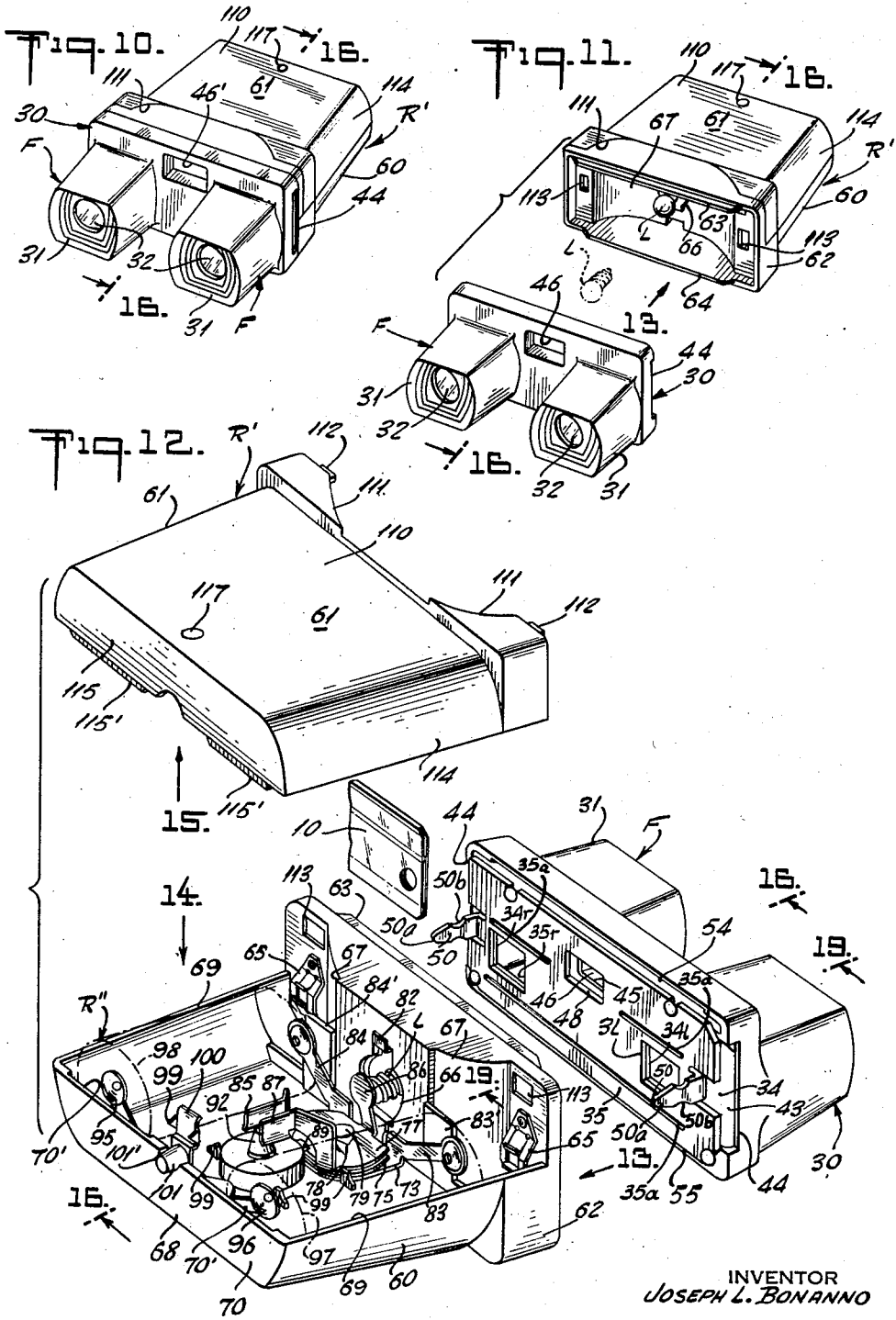
INVENTOR
JOSEPH L. BONANNO
BY
ATTORNEY

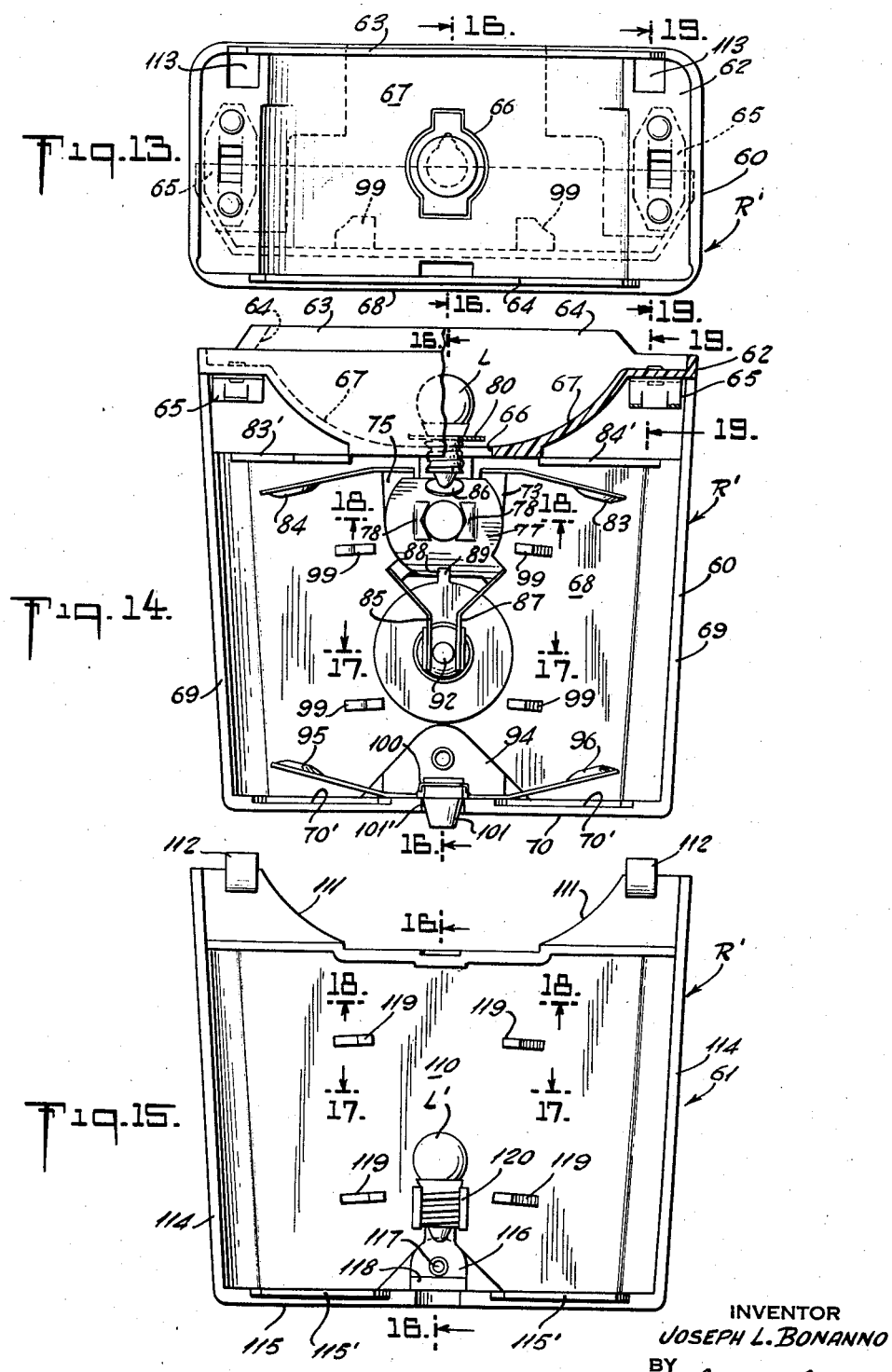

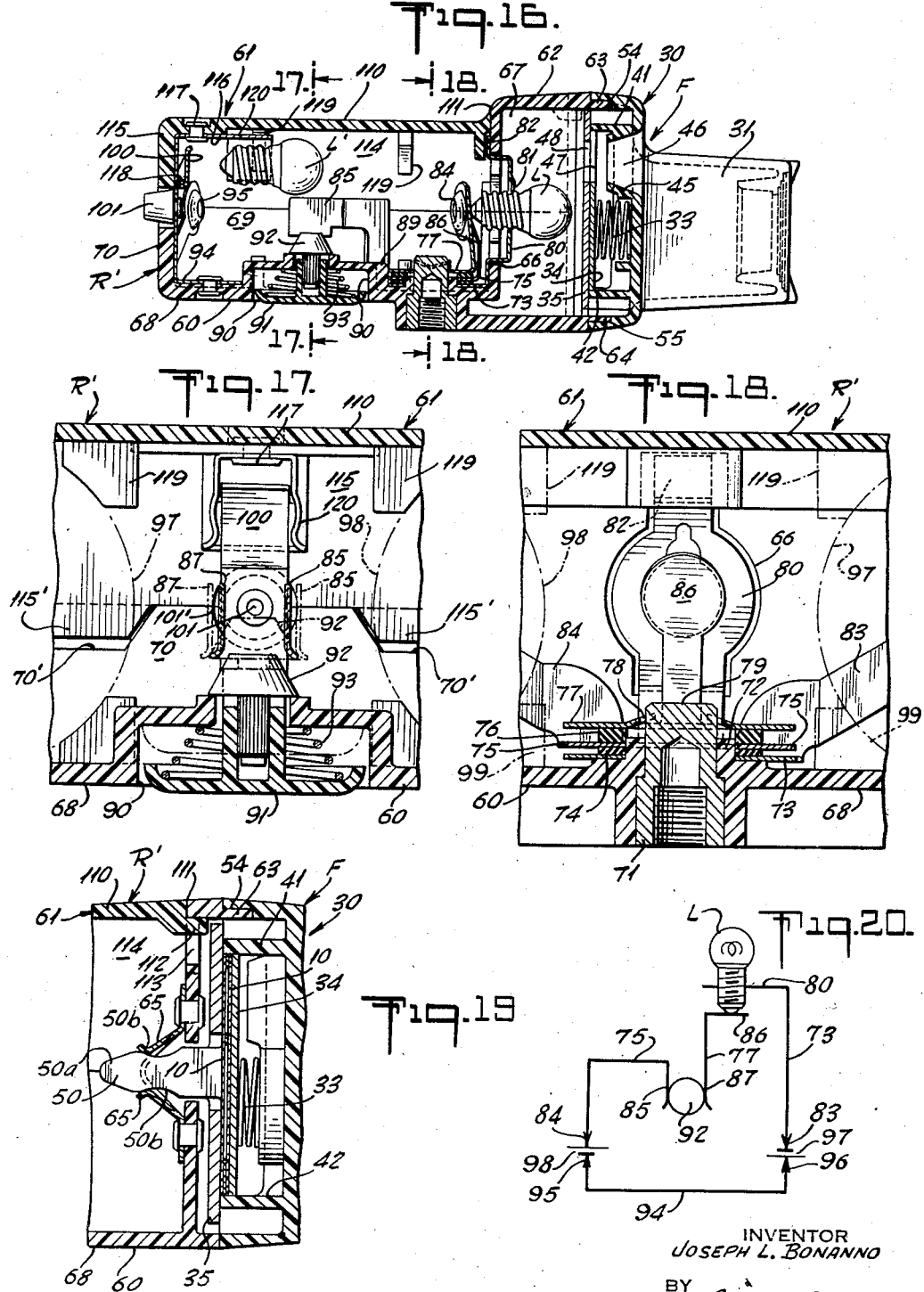

June 9, 1959 J. L. BONANNO 2,889,744
STEREOSCOPIC VIEWERS
Filed Oct. 19, 1954 7 Sheets-Sheet 6
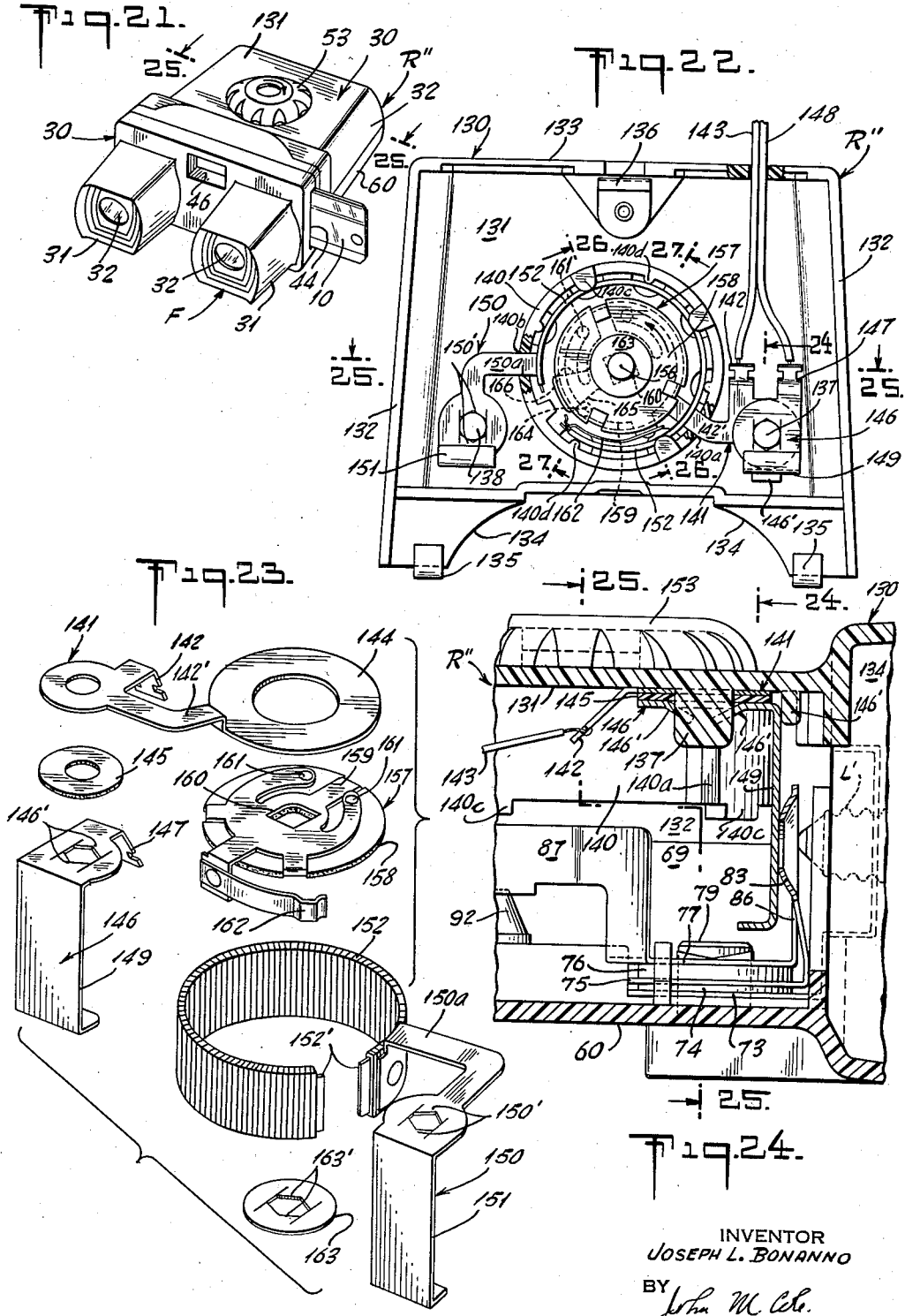
INVENTOR
JOSEPH L. BONANNO
BY
ATTORNEY June 9, 1959 J. L. BONANNO 2,889,744
STEREOSCOPIC VIEWERS
Filed Oct. 19, 1954 7 Sheets-Sheet 7
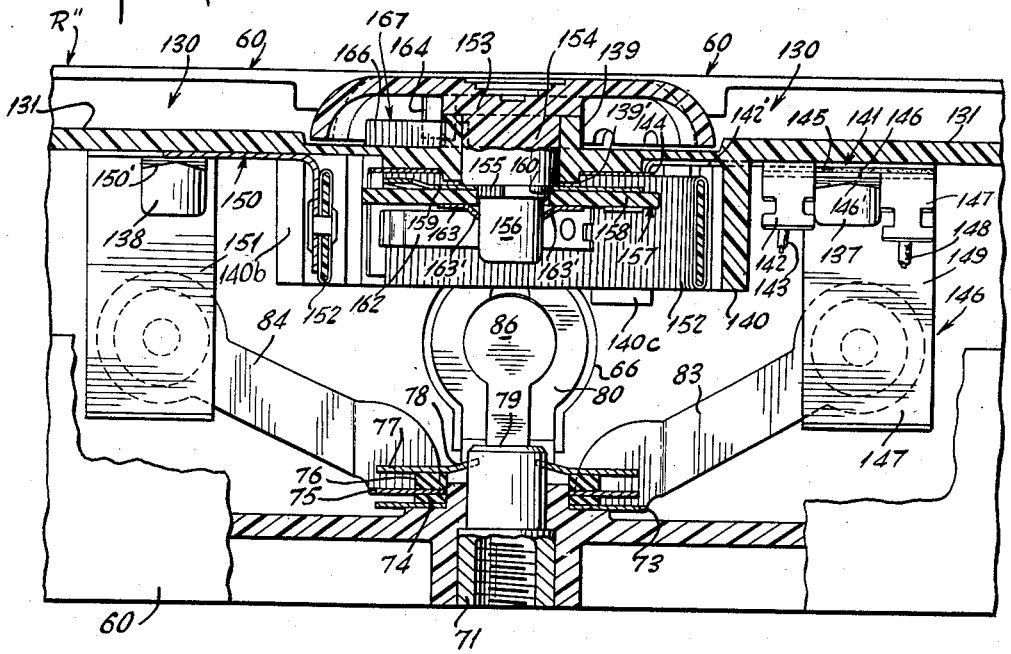
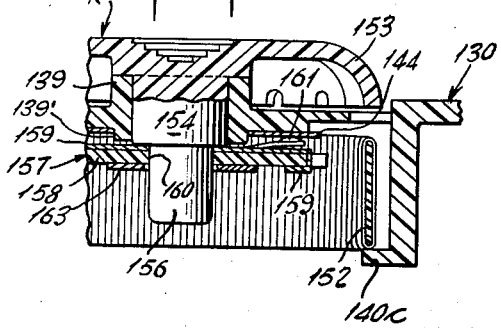
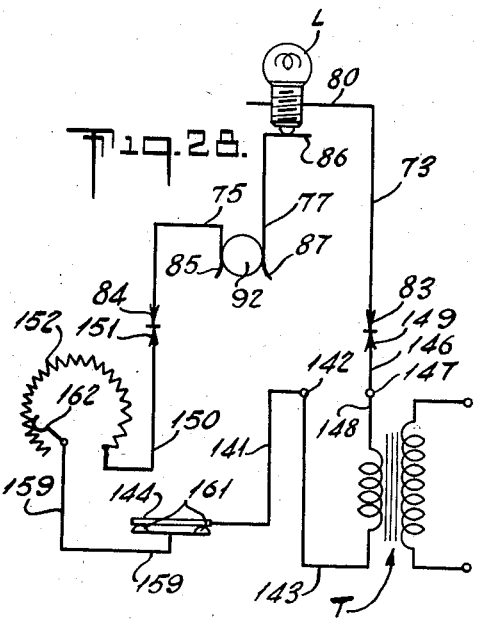
INVENTOR
JOSEPH L. BONANNO
BY
ATTORNEY

United States Patent Office 2,889,744
Patented June 9, 1959

2,889,744

STEREOSCOPIC VIEWERS

Joseph L. Bonanno, South Orange, N.J., assignor to The Lionel Corporation, New York, N.Y., a corporation of New York Application October 19, 1954, Serial No. 463,223

3 Claims. (Cl. 88—31)

The present invention relates to stereoscopic viewers for viewing transparent stereograms by natural light or by artificial light produced by a lamp carried by the viewer.

According to the present invention the viewers to be disclosed herein are more especially arranged for viewing a series of stereograms arranged end to end and carried on a slide horizontally movable past the optical trains whereby the pictures are viewed. The stereograms, preferably carried on 16 mm. film strips, are arranged so that four left eye pictures are end to end and to the left of four right eye pictures also end to end. The size of the pictures is such that four stereo pairs carried on the slide are passed through the viewer in such a manner that one stereogram only can be viewed at a time, the others being masked off.

According to the present invention the stereo viewers are provided with a front component and a rear component, the front component having a construction such that it may be used interchangeably with various forms of rear component. The front component is provided with a back plate and pressure plate between which the viewing slide passes, these plates being suitably apertured to mask all of the pictures on the viewing slide except the pair to be viewed. The front component also has a pair of viewing lenses properly located to focus on the pictures of the stereogram. The front component is so arranged that the viewing slide may be shifted horizontally to present the successive stereo pairs it carries for observation through the lenses. The front component is also preferably provided with a window by which one can see a titling strip on the viewing slide either by reflected or transmitted light. While this front component can be used when suitable extraneous natural or artificial light is available, it is preferable to employ a quick detachable rear component by which the pictures may be lighted from the rear.

The rear component may be a box with a translucent rear window to transmit natural light or utilize the artificial light from a lighting fixture, or it may include a lamp placed to back light the stereogram with a dry cell battery, and suitable conducting strips and switch to control the lamps; or thirdly, it may include the lamp, conducting strips, switch to cut off the lamp, and a low voltage rheostat connectable to an extraneous transformer.

According to the present invention many parts of the battery operated type and the rheostat type of viewer are identical, thereby reducing the cost of tooling and manufacture of the rear components for these styles of viewers.

Other and further objects of the invention will appear as the description proceeds.

The accompanying drawings show, for purposes of illustrating the present invention, three embodiments in which the invention may take form, it being understood that the drawings are illustrative of the invention rather than limiting the same.

In the drawings:

Figure 1 is a transverse sectional view through a viewing slide;

Figure 1a is a side view of a titling strip;

Figure 1b is a side view of a strip of four left eye pictures forming one half of a stereogram with four pictures;

Figure 1c is a side view of a strip of the corresponding four right eye pictures;

Figure 1d is a side view of the viewing strip of Figure 1 with the titling strip and picture strips in place;

Figure 2 is an exploded perspective view of a stereoscopic viewer taken from the rear and showing the front slide carrying component spaced from the rear component which is designed for use with extraneous light;

Figure 3 is a perspective view of the rear component of Figure 2, taken in the opposite direction;

Figure 4 is a front perspective view of the assembled viewer arranged for use with extraneous light;

Figure 5 is a rear elevational view of the front or slide carrying component, taken in the direction of the arrow 5—Figures 2 and 6, parts being broken away;

Figure 6 is a horizontal sectional view taken on the line 6—6 of Figure 5, with parts in elevation, the viewer slide being inserted;

Figure 7 is a front elevational view of the rear component taken in the direction of the arrow 7 of Figures 2 and 6;

Figure 8 is a section on the line 8—8 of Figures 5, 6, 7, with parts in elevation and the viewing slide in position;

Figure 8a is a fragmentary section on the line 8a of Figure 5;

Figure 9 is a section on the line 9—9 of Figures 5, 6 and 7;

Figure 10 is a front perspective view of a stereoscopic viewer employing the front component of Figures 2–9 and a rear component having a battery operated lamp;

Figure 11 is a front exploded perspective view of the viewer of Figure 10;

Figure 12 is a rear perspective exploded view of the battery operated viewer, the battery cells being shown in dot and dash lines;

Figure 13 is a front elevational view of the rear component taken in the direction of the arrow 13 of Figures 11 and 12;

Figure 14 is a plan view of the lower part of the rear battery carrying component, taken in the direction of the arrows 14 of Figure 12;

Figure 15 is an inverted plan view of the cover part of the rear component, taken in the direction of the arrow 15 of Figure 12;

Figure 16 is a vertical section taken on the line 16—16 of Figures 10 to 15, inclusive;

Figures 17 and 18 are transverse sections on the lines 17—17 and 18—18 respectively, of Figures 14, 15 and 16;

Figure 19 is a fragmentary section on the line 19—19 of Figures 12, 13 and 14;

Figure 20 is a wiring diagram for the battery operated viewer of Figures 10–19, inclusive;

Figure 21 is a front perspective view of a stereoscopic viewer employing the front component of the preceding figures and a rear component arranged for operation of the lamp by a low voltage extraneously energized circuit;

Figure 22 is an inverted plan view of the cover member of the rear component of Figure 21 showing an adjustable rheostat;

Figure 23 is an exploded perspective view of the parts forming the rheostat;

Figure 24 is a section at an enlarged scale on the line 24—24 of Figure 22;

Figure 25 is a transverse vertical section taken on the line 25—25 of Figures 21, 22 and 24;

Figures 26 and 27 are fragmentary sectional views taken on the lines 26—26 and 27—27 respectively of Figure 22; and Figure 28 is a wiring diagram.

The viewing slide

A suitable viewing slide together with titling strip and strips of pictures is shown in Figures 1, 1a and 1d, inclusive. The viewing slide is made up of two strips of colorless, transparent plastic material 10—10 with interposed opaque spacer strips 11a, 11b and 11c. These parts are all heat sealed so as to provide a narrow upper channel 12 and a wide lower channel 13. The upper channel is adapted to receive a tilting strip 14, Figure 1a, made of thin translucent paper and having suitable indicia such as indicated in this figure. The lower channel 13 is adapted to receive two transparent positive films 15l and 15r.

Each of these strips 15l and 15r carries four stereograms marked 1L, 2L, 3L, 4L and 1R, 2R, 3R and 4R, respectively. Each transparency has an opaque end as indicated at 16, 17 to insure the reversal of the film strips and proper orientation when placing them in the viewing slide in the position indicated in dotted lines in Figure 1d. The titling strip is arranged so that the arrow is placed opposite the abutting ends of the film strip.

From the foregoing, it will be seen that the assembled viewing slide has a titling strip across the top and four stereo pairs below the titling strip, each pair spaced the interocular distance.

The viewer of Figs. 1–9

The stereoscopic viewer shown in Figures 1 to 9, inclusive, has a front or slide carrying component designated by the letter F and a rear component R designed for employment when viewing pictures illuminated by extraneous light. The front component includes an opaque rectangular plastic body member 30 with two forwardly extending lens tubes or eye pieces 30—31, each carrying a lens 32—32. The plastic body member receives a coiled spring 33 which acts on a pressure plate 34 to press it rearwardly against a back plate 35 spaced from the lenses an amount equal to their focal length. The pressure plate has extensions 37, 37 along the upper edge (Fig. 5) and extensions 38, 38 along the lower edge which enter slots 39, 39 and 40, 40 in ribs 41, 42 of the body member 30, and has upwardly bent ends 43, 43 to facilitate guiding a slide between the plates. The pressure plate 34 and back plate 35 are provided with aligned holes or openings 34l and 34r and 35l and 35r which are opposite the lenses 32—32 and of the size of the pictures. The ends of the viewer body are cut back adjacent the ends of plates 34 and 35, as indicated at 44, 44 to provide end openings for the insertion of this view carrying slide. These plates are embossed, as indicated at 34a and 35a, respectively, to keep the plates out of contact with the picture bearing position of the winding slide. The embossings are approximately .01 inch high.

In order to view the information in the titling strip, the rear part of the body member 30 between and above the lens tubes 31, 31 is provided with walls 45 forming a rectangular opening 46 of the length of a picture and a width corresponding with the width of the titling strip, the pressure plate 34 having an opening 47 about the walls 45, and the back place 35 has a similarly placed opening 48.

When the abutting ends of the film strips are opposite the arrow between areas 2 and 3, Fig. 1d, the films are so located that when the viewer strip is inserted the numbered areas 1, 2, 3, 4, on the titling strip are opposite the openings 46, 47, 48, and the pictures 1L, 1R, are opposite the lenses, so as to be viewed through the openings 34l, 34r, 35l, 35r. These holes frame the pictures and the plates cover the remainder of the viewing strip so that one sees only a stereopair. As the paper of the titling strip is translucent, the titling strip may be read by reflected light and by transmitted light.

While the body member, back plate and pressure plate may be used as a viewer when extraneous light is available, it is preferable to employ these parts as the front component of a complete viewer having provisions for lighting the transparencies and titling strip from the rear.

To facilitate securing the front component to a back component, the back plate 35 is provided with two rearwardly extending prongs 50, 50 having pointed ends 50a and cut outs indicated at 50b.

The rear component R for a viewer adapted to use extraneous light is shown in Figures 2, 3, 4, 6, 7, 8, 9. This viewer has a plastic body member 51 of rectangular shape and provided with fins 52, 53 of unequal length and adapted to enter into slots 54 and 55, Figure 5, in the rear of the front component F. By making these fins of unequal length, it is possible to predetermine the orientation of the back and front components and be sure that the top of the back component is at all times opposite the top of the front component. Various other forms of asymmetrically located parts may be employed for this purpose.

The plastic body 51 is provided with a thin rear wall indicated at 56 which is made translucent. The remainder of the surface of the cover or back component 51 is painted so as to be opaque and cut out extraneous light. To facilitate the holding front and rear components together, the rear component carries two spring clips 57, 57 adapted to enter into the cut outs 50b in the rearwardly extending prongs 50. The rear component may thus be snapped into place and securely held behind the front of the viewer. The translucent panel 56 provides a ready means for illuminating the transparencies by extraneous light and avoids direct observation of a direct light source through the transparencies.

The viewer of Figs. 10–20

In the form of construction illustrated in Figs. 10–19, inclusive, the front component F is the same as that previously described, and the same reference characters are applied to the various parts of this front component. The rear component designated generally in these figures by the letter R′ employs a lower plastic molding 60 which forms a battery box and carries a lamp and circuit connections between the lamp and battery and an upper plastic cover member 61. The lower member 60 has a rectangular front portion 62 of the same size and shape as the rear face of the front component F. It has fins 63 and 64 (corresponding with the long and short fins 52, 53, Figs. 2, 3, 6, 7 and 8) and arranged to enter the mating grooves 54 and 55 of the front component.

The front part 62 also carries spring clips 65, located in the same position as the clips 57 previously described, and adapted to cooperate with the rearwardly extending prongs 50 carried by the front component so that the rear component may be detachably secured to the front component in definite oriented position. The front of the rear component has a central aperture 66 and a forwardly concave portion 67 coated to form a reflector.

The bottom piece 60 has a relatively flat rearwardly extending bottom portion 68, side walls 69, 69, and a rear wall 70. The bottom wall immediately to the rear of the reflector receives a metal contact mounting stud 71, Figs. 16 and 18. This stud is inserted from underneath, and passes up through a boss 72 formed in the molding 60. This boss receives a lower contact strip 73, an insulating washer 74, an intermediate contact strip 75, and another insulating washer 76. These contact strips are resilient sheet metal and together with the washers are held in place by a third contact resilient strip 77 which has teeth 78 adapted to engage the upper end 79 of the mounting stud 71.

The lower contact strip 73 forms a lamp socket terminal and battery contact element. The socket forming part of the element is in the form of an upwardly bent arm 80 apertured at 81 to threadedly receive the lamp, and having an upper end 82 behind the reflector. The battery contact extends to the right as indicated at 83.

The intermediate contact 75 has a battery contact 84 which extends upwardly and to the left and a switch contact 85 which extends upwardly and rearwardly. The bottom member 60 has back stops 83' and 84' to prevent bending the contacts 83 and 84 too far forwardly.

The upper contact element 77 has a central upwardly extending spring element 86 which forms the center contact for the lamp. It also has a rearwardly extending switch contact 87 opposite contact 85. The contact strips 73, 75 and 77 and the washers 74 and 76 are notched as indicated at 88, Fig. 14, to fit a rib 89 formed in the plastic molding 60 so that the contact strips are definitely oriented. The bottom member 60 is recessed from underneath, as indicated at 90, Figs. 16 and 17 to accommodate a push button 91. This push button carries a metal cone-like switch element 92 and is pressed downwardly by a coiled spring 93. The switch element 92 is adapted to bridge between the contacts 85 and 87.

Near the rear, the bottom member carries a combined jumper contact and latch member 94. This member has two spring contacts 95, 96 opposite the contacts 83 and 84 and spaced therefrom to receive dry cells indicated in dotted lines at 97, 98, Figures 17 and 18. The dry cells are held in the proper lateral position by risers 99 formed in the bottom member 60. The rear contact member 94 carries an upwardly extending spring latch 100 and a push button 101, the push button extending out through an opening 101' in the rear wall of the bottom member 60.

When a lamp L is placed in the lamp socket formed by the parts 80 and 86, and two dry cells 97 and 98 are located between the contacts 83, 96 and 84, 95, the lamp is in open circuit until one presses upwardly on the push button 91. This will close the circuit and light the lamp L.

Cover member 61 is shaped to cover the batteries and contacts. It is a plastic molding of the same general shape in plan as the bottom member 60. It has a top wall 110 cut out at the front as indicated at 111 to accommodate the reflector on the bottom member 60. It has prongs 112 which enter into holes 113 in the front wall of the bottom member 60. It has side walls 114, 114, which fit against the side walls 69, 69, of the bottom member and an end wall 115 which fits against the end wall 70 of the bottom member. The walls 70 and 115 have cooperative recesses 70' and 115' which interlock and hold the parts 60 and 61 against relative movement.

A latch plate 116 is secured to the rear of the top member 61 by a rivet indicated at 117. This latch plate has a flange 118 engageable with the spring latch 100 on the plate 94, so as to securely, but releasably, hold the top member in place. The top member has depending lugs 119 which engage the upper surfaces of the dry cells to hold them in place. The latch plate 116 may have provisions indicated at 120 for the support of a spare lamp L', see Fig. 15. The wiring diagram of the device shown in Figs. 10-18 is shown in Fig. 18, corresponding reference characters being applied to the parts above described.

*The viewer shown in Figures 21 to 28*

The form of viewer shown in these figures is designed to use outside power from a transformer T. It uses the same front component F as disclosed in detail in Figures 1 to 10. The rear component R" uses same bottom part 60 as in the rear component R' shown in Figures 10 to 19, inclusive, (except for the rear battery contacts 95, 96 no longer needed) the same reference characters apply to corresponding parts in these views.

The top or cover member 130 resembles the top cover member 61, above described. It has a top wall 131, side walls 132, 132, rear wall 133 and front cut out 134 corresponding in size and shape to similar parts of the cover member shown in Figure 15. It has prongs 135 similar to the prongs 112 and carries a spring catch 136 similar to spring catch 100. The cover member 130 has near the front portion thereof two downwardly extending studs or bosses 137 and 138 and along its center line has a tubular element or hub 139 which, as indicated at 139' extends below the lower face of the member of the cover. It also has a depending flange 140, slotted at 140a and 140b.

The right hand stud 137 in the drawings receives a sheet metal connector 141 shown in perspective in the upper left of Figure 23. The member 141 has a soldering lug 142 for connection to one of the low voltage supply wires 143 and a strap 142' which fits into a slot 140a. It has a ring portion 144 to fit about the depending boss 139' so as to form a continuous contact ring for a movable contact arm to be described. The stud 137 also carries an insulator 145 and a conducting strap 146 having spring teeth 146' to bite into the material of the stud and prevent removal. This strap 146 has a soldering lug 147 for connecting it to the other wire 148 of the low voltage circuit. The strap 146 engages a lug 146' on cover 130 and has a depending leg 149 which is engageable with the spring contact 83 when the cover is in position. The other side of the current supply line is therefore connected through the contact 83 and the strap 73 with the screw shell of the lamp.

The left stud 138 carries a conductor strap 150 provided with similar teeth 150' to securely hold it in position in the stud. The strap 150 has a depending leg 151 similar to the part 149 on strap 146 and adapted to bear against the conducting strip 84 on strap 75 which has switch contact element 85. The strap 150 has an arm 150a which passes through alignment slot 140b and carries, as more clearly shown in Figure 23, a cylindrical resistor 152 wound on an insulating coil form 152. The resistor inside the circular flange 140 is positioned accurately by bottom lugs 140c and vertical ribs 140d. A knob 153 has a shaft portion 154 which passes through the hub 139. It has an asymmetric portion indicated at 155 and a reduced lower end 156. The portion 156 of the knob shaft receives a rotor 157 made up of an insulating disc 158 and a conducting stamping 159 secured to the disc and having an opening 160 to fit about the part 155 of the knob shaft. The conducting strip 159 has contact buttons 161, 161, engageable with the undersurface of the ring 144 and carries a spring arm 162 adapted to sweep over the inner surface of the resistance 152. The insulating disc 158 is held in place on the lower end 156 of the knob by a disc 163 having teeth 163' which bite into the material. The knob 153 carries a stop 164 engageable with the sides 165, 166 of a riser 167 carried by the cover 130, see Figs. 25 and 27, to limit the movement of the knob. The circuit for the device shown in Figures 21 to 28 is illustrated in Figure 28. It resembles the circuit shown in Figure 20 and uses many of the same parts. The circuit can be traced from the wire 143 through the conducting strip 141 to the ring 144, contacts 161, 161, on the conductor 159 to the spring 162 then through the resistor 152, conducting strap 150 to spring contact 84, strap 75, switch contact 85, switch button 92, switch contact 87, strap 77, spring contact 86, lamp L, strap 73, contact 83, then through strap 146 to the other side of the line. If desired, the control switch in the body of the viewer may be replaced by an extraneous switch.

Since it is obvious that the invention may be embodied in other forms and constructions within the scope of the claims, I wish it to be understood that the particular forms shown are but three of these forms and, various modifications and changes being possible, I do not otherwise limit myself in any way with respect thereto.

I claim:

1. A steroscopic viewer comprising, in combination, a main body member having spaced sides and an open back, a pair of forwardly extending interocularly spaced lens tubes carrying a pair of magnifying lenses spaced forwardly from the opening defining portions of said main body member an amount equal to the focal length of the lenses, a back plate secured across the open back of said main body member, a displaceable pressure plate disposed within said main body member in front of said back plate, a spring urging said pressure plate toward said back plate, said spaced plates defining cutouts adjacent to the opposite ends of said pressure plate for slidably receiving a viewing slide laterally through the viewer between the pressure plate and the back plate, said pressure plate and said back plate having aligned openings opposite said lenses, said pressure plate exerting a uniform pressure upon stereogram slides moved laterally past the field of view of the lenses along said back plate, said body and pressure plate having portions defining aligned apertures above the level of the lens tubes to permit viewing between said tubes of a title on the viewing slide above and midway between the pictures of the stereogram, said back plate further comprising rearwardly extending prongs within the outline of said body member, and a back component having illumination means for back lighting the stereogram slide detachably connected to said prongs to define with said main body member a completely self-contained viewer assembly having a smooth and continuous outer surface.

2. A stereoscopic viewer as claimed in claim 1, wherein the back plate has an aperture opposite the title viewing aperture to back light the title.

3. A stereo viewer as claimed in claim 1, wherein the ends of the pressure plates extend forwardly inside the body and guide the slide into place.

References Cited in the file of this patent

UNITED STATES PATENTS

| | | |
|---|---|---|
| 1,808,176 | Pieper et al. | June 2, 1921 |
| 1,997,642 | Klein | Apr. 16, 1935 |
| 2,117,910 | Rossman | May 17, 1938 |
| 2,318,874 | Mast | May 11, 1943 |
| 2,349,013 | Sparling | May 16, 1944 |
| 2,449,483 | Iwick | Sept. 14, 1948 |
| 2,484,591 | Rochwite | Oct. 11, 1949 |
| 2,511,334 | Gruber | June 13, 1950 |
| 2,604,814 | Smith | July 29, 1952 |
| 2,643,577 | Williams | June 30, 1953 |
| 2,649,837 | Wiese | Aug. 25, 1953 |

FOREIGN PATENTS

| | | |
|---|---|---|
| 461,795 | Italy | Feb. 14, 1951 |
| 651,333 | Great Britain | Mar. 14, 1951 |
| 1,080,979 | France | June 2, 1954 |